(12) United States Patent
Caruel et al.

(10) Patent No.: US 11,767,807 B2
(45) Date of Patent: Sep. 26, 2023

(54) DOOR-CLOSING SYSTEM FOR A THRUST REVERSER OF AN AIRCRAFT NACELLE

(71) Applicant: Safran Nacelles, Gonfreville l'Orcher (FR)

(72) Inventors: Pierre Caruel, Moissy Cramayel (FR); Alexandre Descamps, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 43 days.

(21) Appl. No.: 17/402,041

(22) Filed: Aug. 13, 2021

(65) Prior Publication Data

US 2022/0120238 A1 Apr. 21, 2022

Related U.S. Application Data

(63) Continuation of application No. PCT/FR2020/050232, filed on Feb. 10, 2020.

(30) Foreign Application Priority Data

Feb. 14, 2019 (FR) ..................................... 19/01500

(51) Int. Cl.
 *F02K 1/60* (2006.01)
 *F02K 1/76* (2006.01)

(52) U.S. Cl.
 CPC ............... *F02K 1/60* (2013.01); *F02K 1/605* (2013.01); *F02K 1/763* (2013.01); *F02K 1/766* (2013.01)

(58) Field of Classification Search
 CPC . F02K 1/60; F02K 1/605; F02K 1/763; F02K 1/766; F01D 17/02
 See application file for complete search history.

(56) References Cited

U.S. PATENT DOCUMENTS

| 4,147,027 A | * | 4/1979 | Greathouse | ............... | F02K 1/60 60/230 |
| 4,424,669 A | * | 1/1984 | Fage | ....................... | F02K 1/766 244/110 B |

(Continued)

FOREIGN PATENT DOCUMENTS

| EP | 1903205 | 3/2008 |
| FR | 3027066 | 4/2016 |

OTHER PUBLICATIONS

International Search Report for International Application PCT/FR2020/050232, dated May 11, 2020.

*Primary Examiner* — Andrew H Nguyen (57) ABSTRACT

A closing system that includes a closing actuator for doors of a thrust reverser, two sliding members, and a detection device. The closing actuator includes two first connecting rods. Each first connecting rod is configured to be connected to a first lateral edge of each door. The closing actuator is arranged to move each door at least towards the direct jet position. Each sliding member carries a second connecting rod configured to be connected to a second lateral edge of each door. The second connecting rods are arranged to be driven by the doors when the closing actuator moves the doors towards the direct jet position so as to displace the two sliding members. The detection device detects a defect of one of the first and second connecting rods. The detection device is configured to detect the relative position of the two sliding members in the direct jet position.

14 Claims, 8 Drawing Sheets

(56) References Cited

U.S. PATENT DOCUMENTS

| | | | | |
|---|---|---|---|---|
| 5,392,991 A | * | 2/1995 | Gatti | F02K 1/60 |
| | | | | 239/265.29 |
| 5,775,639 A | * | 7/1998 | Fage | F02K 1/60 |
| | | | | 239/265.29 |
| 5,826,823 A | * | 10/1998 | Lymons | F02K 1/76 |
| | | | | 239/265.29 |
| 6,260,801 B1 | * | 7/2001 | Peters | F02K 1/60 |
| | | | | 239/265.29 |
| 2017/0342942 A1 | | 11/2017 | Smith et al. | |
| 2019/0120173 A1 | * | 4/2019 | Ghandour | F02K 1/60 |

* cited by examiner

DOOR-CLOSING SYSTEM FOR A THRUST REVERSER OF AN AIRCRAFT NACELLE

CROSS-REFERENCE TO RELATED APPLICATIONS

This application is a continuation of International Application No. PCT/FR2020/050232, filed on Feb. 10, 2020, which claims priority to and the benefit of FR 19/01500 filed on Feb. 14, 2019. The disclosures of the above applications are incorporated herein by reference.

FIELD

The present disclosure relates to a door closing system for a thrust reverser of an aircraft nacelle, and more particularly a system for closing pivoting doors via connecting rods.

BACKGROUND

The statements in this section merely provide background information related to the present disclosure and may not constitute prior art.

In order to shorten the braking distance of an aircraft equipped with turbojet engines each surrounded by a nacelle providing a guiding of a flow of gas generated by the turbojet engine, it is known to equip the aircraft with at least one thrust reverser.

A nacelle generally has a structure including an air inlet upstream of the engine, a middle section configured to surround a fan or the compressors of the turbojet engine and its casing, and a downstream section able to accommodate a thrust reversal device and configured to surround the combustion chamber of the turbojet engine, and is generally terminated by an ejection nozzle whose outlet is located downstream of the turbojet engine.

Furthermore, a nacelle includes an outer structure having the air inlet, the middle section and the downstream section, and an inner fixed structure (IFS), concentric with the downstream section and surrounding the core of the turbojet engine behind the fan. These outer and inner structures define an annular flow channel, also called a secondary flow path, aimed at channeling a flow of cold air, called secondary air, which circulates outside the turbojet engine.

The thrust reverser includes movable thrust reverser elements, generally two movable thrust reverser elements, carried by the nacelle to be displaced between a closed position in which the thrust reverser is inactive, called direct jet, and an open position in which the thrust reverser is active, called reverse jet.

In the reverse jet position, the thrust reverser returns at least part of the gas flow generated by the turbojet engine in the reverse direction to the flow guided by the nacelle.

In a thrust reversal type, the movable reversal elements are doors.

In some existing door thrust reversers, the position of the doors is controlled by double-acting or single-acting cylinders. The cylinders are arranged on the nacelle and connected to the lateral ends of the doors by connecting rods in order to displace these doors.

A double-acting cylinder includes two chambers which can be placed in communication with a fluid, independently of one another, in order to exert a force in one direction or the other. On the other hand, a single-acting cylinder includes only one chamber that can be placed in communication with a fluid in order to exert a force in one direction (opening or closing).

The term "lateral end" of a door is understood to mean a side of the door disposed perpendicular to the upstream and downstream walls of the doors. The upstream and downstream walls being the walls disposed respectively on the upstream side and on the downstream side of the nacelle according to the direction of flow of the gas flow generated by the turbojet engine.

In the case of a thrust reverser including two opposite doors and single-acting cylinders, it is known to dispose an opening cylinder on one side of the nacelle close to a lateral end of the doors, and a closing cylinder on one side of the nacelle diametrically opposite to the fixing side of the opening cylinder, relative to an axis along which the nacelle extends, namely close to the other lateral end of the doors. Each cylinder is connected to each of the doors by means of a connecting rod in order to allow the doors to be opened or closed. Thus, each cylinder is connected to two connecting rods, and each door is kept open by two connecting rods arranged at each of its lateral ends. Each connecting rod is connected to a different cylinder.

The connecting rods also make it possible to transmit the forces of the doors to the fixed structure when the doors are in the open position. Thus, in the reverse jet position, each door has a force absorption that is substantially balanced laterally by two connecting rods disposed at each of its lateral ends.

In the case of a thrust reverser including two opposite doors and a single double-acting or single-acting cylinder, it is known practice to place the cylinder on one side of the nacelle close to a lateral end of the doors. The cylinder is connected to each of the doors by a first connecting rod in order to allow the opening and closing of the doors. A sliding member connected to each of the doors by a second connecting rod is further disposed on a side of the nacelle diametrically opposite to the fixing side of the double-acting cylinder, relative to an axis along which extends the nacelle, namely close to the other lateral end of the doors.

The first connecting rods therefore make it possible both to maneuver the doors and to transmit the forces from the doors to the fixed structure when the doors are in the open position. The second connecting rods make it possible to transmit the forces of the doors to the fixed structure when the doors are in the open position. Thus, each door has a resumption of forces substantially balanced laterally by two connecting rods arranged at each of its lateral ends.

Typically, when a connecting rod has a defect or otherwise malfunctions, such as if the connecting rod breaks or becomes disconnected for example, the forces are only taken up by a connecting rod, and asymmetrically.

A drawback of the typical systems is then that each door is sized so that a single connecting rod can transmit the forces of the doors to the fixed structure when the doors are in the open position, and for a large number of operating cycles. Further, it is difficult to detect defects or malfunction of the connecting rod in typical systems.

SUMMARY

This section provides a general summary of the disclosure and is not a comprehensive disclosure of its full scope or all of its features.

The present disclosure provides a system for closing a pair of doors for a thrust reverser of an aircraft nacelle. The doors are diametrically opposed to each other and mounted to be able to pivot between a direct jet position in which the doors provide the aerodynamic continuity of the nacelle, and a reverse jet position in which the doors open at least one passage in the nacelle. The system further includes an actuator, two sliding members, and a detection device for detecting a defect or malfunction of a connecting rod. The actuator closes the doors and includes two first connecting rods. Each first connecting rod is configured to be connected to a first lateral edge of each door. The actuator is configured to maneuver each door at least towards the direct jet position. The sliding members each carry a second connecting rod configured to be connected to the lateral edge opposite the first lateral edge of each door. The second connecting rods are configured to be driven by the doors when the closing actuator maneuvers the doors towards the direct jet position, so as to displace the sliding members. The detection device is configured to detect the relative position of the sliding members in the direct jet position.

In some configurations, the first and second connecting rods are supports for the doors in the reverse jet position, thereby allowing the passage of the forces of the doors to a fixed structure of the nacelle.

Thus, the system according to the present disclosure makes it possible to detect defects or malfunction of connecting rods of door thrust reversers after an operating cycle, that is to say after a cycle of opening and closing the doors.

The doors can be identical or different.

In one form, the closing actuator is configured to maneuver the doors to the direct jet position and to the reverse jet position.

In another form, the closing actuator is a double-acting cylinder and the closing system is an actuation system allowing the opening and closing of the doors.

In yet another form, the closing actuator is configured to maneuver the doors towards the direct jet position.

In one form, the closing actuator is a single-acting cylinder and the closing system is an actuation system allowing the doors to be closed.

In another form, the closing actuator is configured to maneuver the doors towards the direct jet position, and the closing system includes an opening actuator configured to maneuver the doors towards the reverse jet position via the second connecting rods.

In yet another form, the closing actuator and the opening actuator are single-acting cylinders and the closing system is an actuation system allowing the opening and closing of the doors.

In one form, when closing the doors, a sliding member associated with a second defective connecting rod is not displaced by the second connecting rod. It is therefore offset with respect to a sliding member associated with a second functional connecting rod.

In another form, when the doors are closed, when a first connecting rod is defective, the associated door remains in the open position and the sliding member associated with this door is not displaced by the second connecting rod with which it is associated. It is therefore offset with respect to a sliding member associated with a closed door.

In yet another form, the detection device then detects the defect of a first or second connecting rod by comparing the relative position of the two sliding members.

According to one variation, the closing system includes a spring disposed at the proximal ends of each sliding member with respect to the detection device, and an end stop disposed between the detection device and each spring. The end stops are connected by a connecting device. Each spring makes it possible to exert a force against the associated sliding member in the direction opposite to the displacement generated by the second connecting rods driven by the doors in the direct jet position.

According to a variation, each spring is designed to be compressed by the associated sliding member when the second connecting rods are driven by the doors in the direct jet position.

According to another variation, the end stops and the connecting device allow the passage of reverse jet forces.

According to yet another variation, the end stops and the connecting device are fixed.

According to a variation, the end stops and the connecting device are sliding.

According to another variation, the end stops and the connecting device form a sliding element including two housings. Each housing includes a sliding member, a spring and an end stop.

According to yet another variation, the sliding element is designed to slide under the action of at least one of the second connecting rods when the spring is compressed in the closing direction.

According to a variation, in the direct jet position, a clearance is present between the sliding element and the end opposite the compressed spring of each sliding member associated with a second functional connecting rod.

According to another variation, a door associated with a first defective connecting rod is closed when the sliding element slides in the closing direction under the action of the second connecting rod of the door associated with the first functional connecting rod. The door associated with the first defective connecting rod is closed with an offset relative to the door associated with the first functional connecting rod.

According to yet another variation, the sliding element allows the passage of forces during opening and in reverse jet and makes it possible to inhibit a forceful opening of the doors in the event of a defective first connecting rod during the opening.

According to a variation, the closing system includes an actuation control for the electric and/or hydraulic closing actuator.

According to another variation, the closing system as described above further includes a system for locking the doors in the closed position. Such a locking system is designed to be actuated when the detection system does not detect a defect of the connecting rod.

According to yet another variation, the door locking system is an active locking system including at least one active locking device capable of assisting the closing of the doors by applying a force to close them. The active locking device is movable between a locking position and an unlocking position.

According to a variation, the active locking system is configured to be disposed on the side opposite to the closing actuator. The active locking device is a means for allowing the locking and the closing at least over part of the end of travel of the doors.

According to another variation, the active locking system includes one or more of the following optional characteristics considered alone or in all the possible combinations: an actuation control of the electrical and/or hydraulic, and mechanical locking system; an actuator of the active locking means controlled by the actuation control of the locking system; the locking system actuation control is identical to the closing actuator actuation control, thus a single control allows actuating the closing and the locking/unlocking; at least one blocking device of the active locking means in the unlocked position, movable between a blocking position and an unblocking position; a device for displacing blocking means configured to displace the blocking device to the unblocked position when the doors are at a predetermined position, so that the active locking device can only lock the door when the door is at a predetermined position, although the locking was activated when the door closing control was given; the locking device includes at least one hook; the actuator of the locking means is a cylinder; the blocking device includes two articulated arms, a first arm being fixedly connected to the locking device and the other arm being fixedly connected to the fixed structure; a fixed stop is configured to be disposed on the fixed structure, so as to limit the movement of the arm connected to the fixed structure beyond a certain angle to provide the blocking function; the device for displacing the blocking device is configured to be mechanically connected to the movable element, for example the displacement device is a sliding member of the sliding device as described above, designed to slide when the door is closed with which it is associated in the direction of the blocking device so as to displace it to the unblocked position when the door is in a predetermined position; and a blocking spring is configured to exert a force against the blocking device in the direction opposite to the displacement of the device for displacing the blocking device when closing the door, the spring is designed to be compressed by the blocking device during the displacement of the displacement device when the door is closed.

The present disclosure also provides a thrust reverser of an aircraft nacelle. The thrust reverser includes at least one pair of diametrically opposed doors. The doors are pivotally mounted between a direct jet position in which the doors provide the aerodynamic continuity of the nacelle, and a reverse jet position in which the doors open at least one passage in the nacelle. The thrust reverser further includes a system for closing the doors as described above.

The present disclosure further provides a method for using a system for closing a pair of doors as described above. The method includes a step of comparing the relative position of the sliding members.

The present disclosure further provides a method for using a system for closing a pair of doors as described above, including a locking system as described above. The method includes a step of locking the doors in the direct jet position when the system for detecting defects of the connecting rod does not detect any offset between the sliding members.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description which will follow and in the claims, identical, similar or analogous components will be designated by the same reference numerals and the terms "upstream", "downstream", "horizontal", "vertical", "upper", "lower", etc. will be used without limitation and with reference to the drawings in order to facilitate the description.

Figure 1:
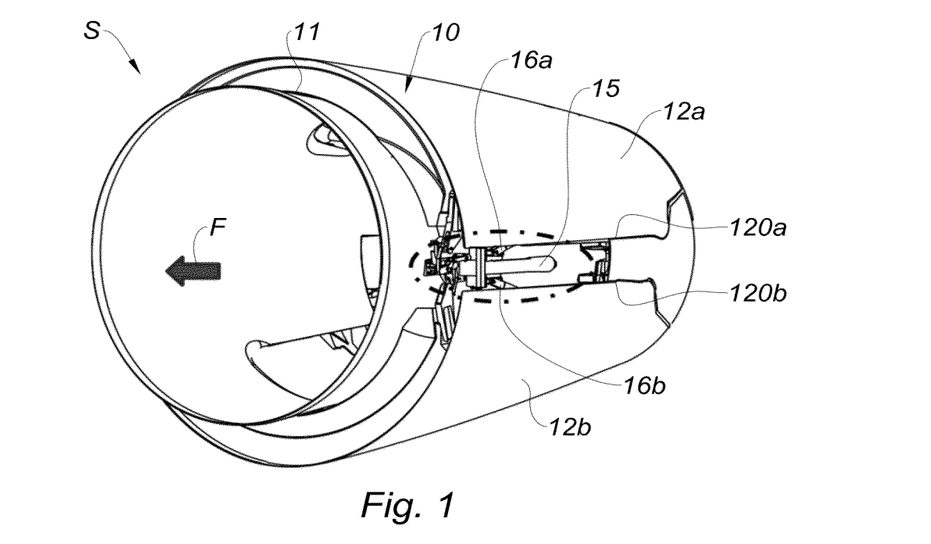
FIG. 1 is a perspective view of a portion of a downstream section of a nacelle including a door thrust reverser whose doors are in a direct jet position and an actuator for closing the doors of a closing system according to the present disclosure.

FIG. 1 shows part of a downstream section S of a nacelle, that includes a thrust reverser 10.

The downstream section S further includes a fixed inner structure 11 and an outer structure including a movable outer structure including two doors (i.e., upper door 12a and lower door 12b), and a fixed outer structure 13 (FIG. 2) upstream of the movable outer structure including the doors 12a, 12b.

The upstream of the downstream section S is defined by the arrow F.

Figure 2:
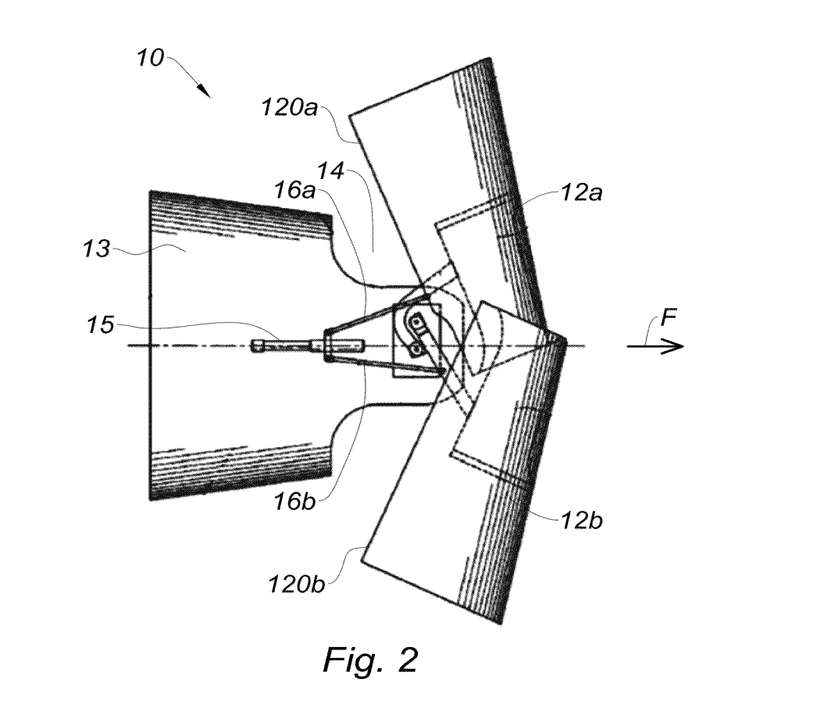
FIG. 2 is a side view of the door thrust reverser of FIG. 1 with the doors in a reverse jet position and showing the actuator for closing the doors.

The upper door 12a and lower door 12b are shown in FIG. 1 in the direct jet position. With reference to FIGS. 1 and 2, the doors 12a, 12b are pivotally mounted such that the doors 12a, 12b can pivot between this direct jet position (FIG. 1)

in which the doors 12a, 12b provide aerodynamic continuity of the nacelle, and a reverse jet position (FIG. 2) in which the doors 12a, 12b open at least one passage 14 in the nacelle.

The direct jet position corresponds to the closed position (closed doors) while the reverse jet position corresponds to the open position (open doors).

A double-acting cylinder 15 is placed on the fixed inner structure 11. The double-acting cylinder 15 is connected to each door 12a, 12b by first connecting rods (i.e., upper first connecting rod 16a and lower first connecting rod 16b).

Each first connecting rod 16a, 16b is connected to a first lateral edge (i.e., upper first lateral edge 120a and lower first lateral edge 120b) of each door 12a, 12b.

Thus, the double-acting cylinder 15 is arranged on the fixed inner structure, at the level of a first lateral edge 120a, 120b of the doors 12a, 12b.

Each first connecting rod 16a, 16b includes one end connected to a door 12a, 12b, and an opposite end connected to the double-acting cylinder 15. The double-acting cylinder 15 is configured to maneuver or move the doors 12a, 12b from the direct jet position (FIG. 1) to the reverse jet position (FIG. 2) and from the reverse jet position to the direct jet position. The double-acting cylinder 15 is therefore an actuator for closing and an actuator for opening the doors 12a, 12b.

FIG. 2 shows the thrust reverser 10 of FIG. 1 with the doors 12a, 12b being in the open reverse jet position.

As described above, the double-acting cylinder 15 is connected to each first lateral edge 120a, 120b, of each door 12a, 12b by the first connecting rods 16a, 16b.

Figure 3:
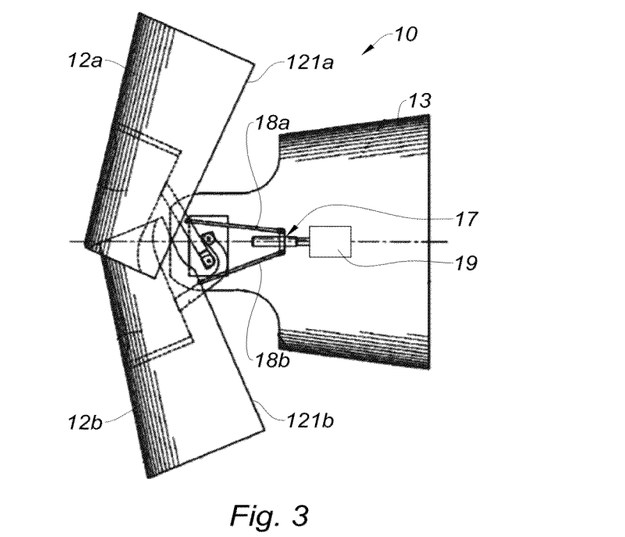
FIG. 3 is another side view of the door thrust reverser of FIG. 1 showing a sliding element of the door closing system.

As shown in FIG. 3, the thrust reverser 10 includes a sliding element 17 disposed on the fixed inner structure 11 (FIG. 1) on the side opposite the double-acting cylinder 15.

The sliding element 17 is connected to each door 12a, 12b by second connecting rods (i.e., upper second connecting rod 18a and lower second connecting rod 18b).

The thrust reverser 10 further includes a detection device 19 for detecting defects of one of the connecting rods 16a, 16b, 18a, 18b, associated with the sliding element 17.

Each second connecting rod 18a, 18b is connected to a second lateral edge (i.e., upper lateral edge 121a and lower lateral edge 121b) opposite to the first lateral edge 120a, 120b, of each door 12a, 12b.

Thus, the sliding element 17 is disposed on the fixed inner structure at the level of the lateral edge 121a, 121b opposite the lateral edge 120a, 120b of the doors 12a, 12b.

The second connecting rods 18a, 18b, are configured to be driven by the doors 12a, 12b, when the double-acting cylinder 15 (FIG. 2) maneuvers the doors 12a, 12b, towards the direct jet position (FIG. 1). by sliding in the sliding element 17.

Figure 4:
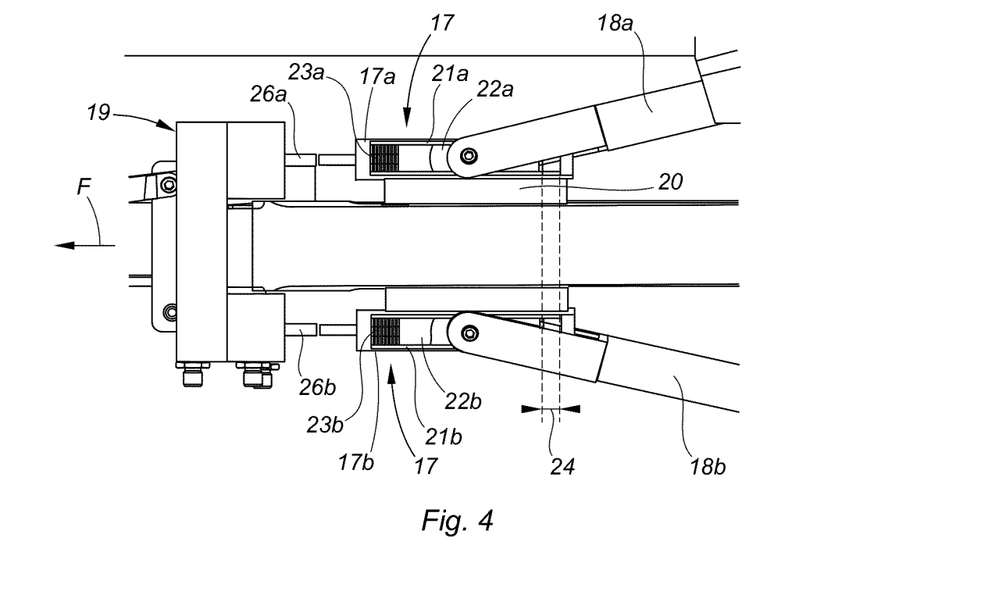
FIG. 4 is a side view of the sliding element of FIG. 3, illustrating the sliding element when the doors are in the direct jet position.

FIG. 4 shows, in more detail, the sliding element 17 and the device 19 for detecting defects of the second connecting rods 18a, 18b of FIG. 3.

The sliding element 17 includes two housings (i.e., upper housing 21a and lower housing 21b) in which sliding members (i.e., upper sliding member 22a and lower sliding member 22b) slide. The housings 21a, 21b are connected by a connecting device 20.

Springs (i.e., upper spring 23a and lower spring 23b) are arranged in the housings 21a, 21b upstream of the sliding members 22a, 22b. The upstream is represented by the arrow F. The sliding element 17 forms an end stop 17a, 17b, upstream of each sliding member 22a, 22b. Each sliding member 22a, 22b carries one of the second connecting rods 18a, 189b. Thus, each second connecting rod 18a, 18b includes one end connected to one of the doors 12a, 12b, and an opposite end connected to one of the sliding members 22a, 22b.

The second connecting rods 18a, 18b, are configured to be driven by the doors 12a, 12b when the double-acting cylinder 15 (FIG. 2) maneuvers the doors 12a, 12b towards the direct jet position, so as to displace the sliding members 22a, 22b to which they are connected.

Each spring 23a, 23b is designed to be compressed by the sliding member 22a, 22b with which it is associated, when the second connecting rods 18a, 18b are driven by the doors 12a, 12b in the direct jet position.

Furthermore, each spring 23a, 23b, makes it possible to exert a force against the sliding member 22a, 22b with which it is associated in the direction opposite to the displacement generated by the second connecting rods 18a, 18b, driven by the doors 12a, 12b in the direct jet position, and is designed to be compressed by the sliding member 22a, 22b with which it is associated, when the second connecting rods 18a, 18b are driven by the doors 12a, 12b in the direct jet position.

Thus, in the direct jet position, the springs 23a, 23b are compressed by the sliding members 22a, 22b, and a clearance 24 is present in each housing 21a, 21b, downstream of each sliding member 22a, 22b.

The sliding element 17 is designed to slide under the action of the connecting rod 18a, 18b when the spring 23a, 23b is compressed in the closing direction, or when the clearance 24 is consumed in the opening direction.

Consequently, a door whose first connecting rod is defective is closed or opened when the sliding element slides. The operation of the sliding element 17 will be described below.

The device 19 for detecting defects of a connecting rod 16a, 16b, 18a, 18b for its part includes two sensors (i.e., upper sensor 26a and lower sensor 26b) such as flow paths, contact sensors or proximity sensors, configured to detect the position of the sliding members 22a, 22b.

The detection device 19 is configured to detect the relative position of the sliding members 22a, 22b in the direct jet position by comparison of the data received by the sensors 26a, 26b.

The operation of the door closing system according to the present disclosure will be described with reference to FIGS. 5 and 6.

Figure 5:
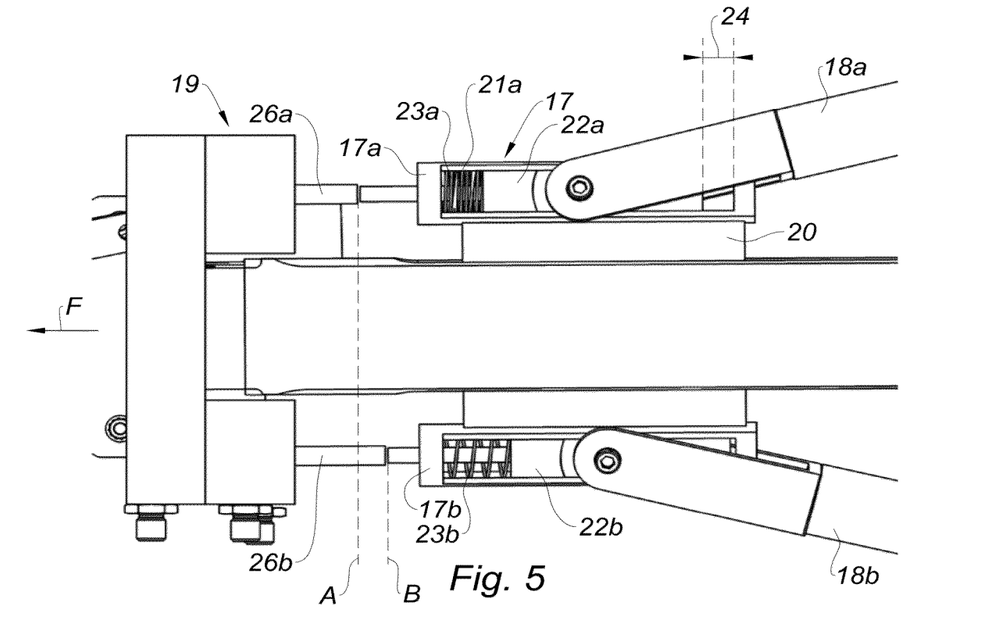
FIG. 5 is a side view of the sliding element of FIG. 3, illustrating the sliding element in a condition in which a first lower connecting rod of the sliding element is defective with the upper door being in the direct jet position.

FIG. 5 shows the sliding element 17 in the case where the upper door 12a (FIGS. 1-3 and 7) is in the direct jet position and the first lower connecting rod 16b (FIGS. 1-2) is defective. The lower door 12b (FIGS. 1-3 and 7) therefore is either in a reverse jet position, or in an intermediate position between the direct jet and reverse jet positions.

When closing the doors 12a, 12b (FIGS. 1-3 and 7), the second upper connecting rod 18a driven by the upper door 12a displaces the upper sliding member 22a upstream (arrow F), which compresses the upper spring 23a.

Thus, the clearance 24 as described with reference to FIG. 4 appears in the upper housing 21a, downstream of the upper sliding member 22a.

The second lower connecting rod 18b on the other hand does not displace the lower sliding member 22b. The lower spring 23b is in a relaxed position and the lower sliding member 22b is substantially in contact with the sliding element 17 at its downstream end.

Then the second upper connecting rod 18a, driven by the upper door 12a (FIGS. 1-3 and 7), displaces the sliding element 17 upstream (arrow F), which displaces the lower sliding member 22b without compressing the lower spring 23b.

The closing of the lower door 12b (FIGS. 1-3 and 7) is forced by the displacement of the sliding element 17 upstream (arrow F).

The upper sensors 26a of the detection device 19 detects a position A of the upper sliding member 22a, the lower sensor 26b of the detection device 19 detects a position B of the lower sliding member 22b, and the detection device 19 compares the detected positions A and B.

If the positions A and B are different, the detection device 19 indicates an abnormal position of the lower sliding member 22b which is offset downstream with respect to the upper sliding member 22a.

The detection device 19 then detects a defect of a connecting rod by comparing the relative position of the two sliding members 22a, 22b.

Figure 6:
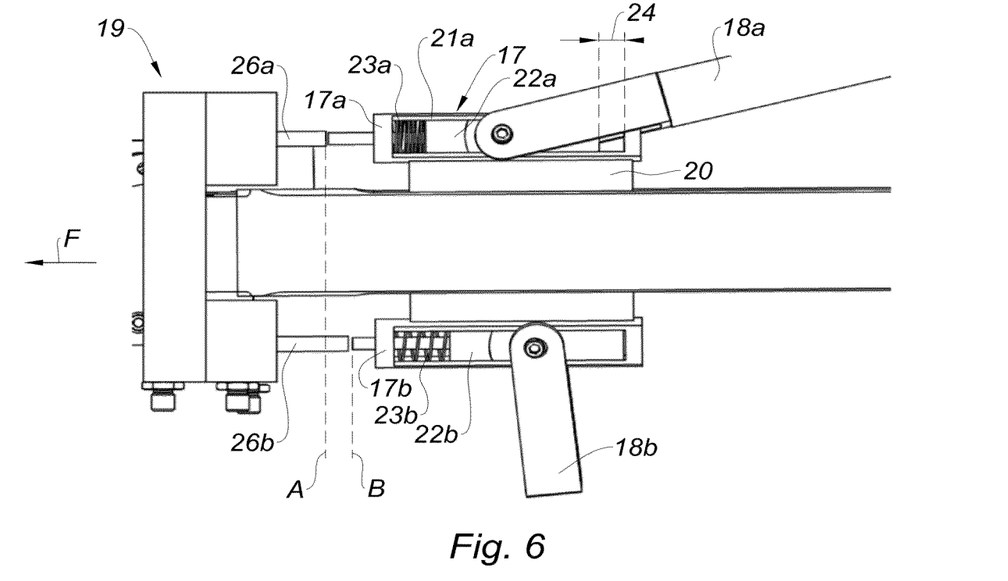
FIG. 6 is a side view of the sliding element of FIG. 3, illustrating the sliding element in a condition in which a second lower connecting rod is defective.

FIG. 6 shows the sliding element 17 in the case where the upper and lower doors 12a, 12b (FIGS. 1-3 and 7) are in the direct jet position and the second lower connecting rod 18b is defective.

When the doors are closed, the second upper connecting rod 18a, driven by the upper door 12a (FIGS. 1-3 and 7), displaces the upper sliding member 22a upstream (arrow F), which compresses the upper spring 23a.

Thus, the clearance 24 as described with reference to FIG. 4 appears in the upper housing 21a, downstream of the upper sliding member 22a.

The second lower connecting rod 18b on the other hand does not displace the lower sliding member 22b, although the two doors 12a, 12b (FIGS. 1-3 and 7) are closed. The lower spring 23b is in a relaxed position and the lower sliding member 22b is substantially in contact with the sliding element 17 at its downstream end.

The upper sensors 26a of the detection device 19 detects a position A of the upper sliding member 22a, the lower sensor 26b of the detection device 19 detects a position B of the lower sliding member 22b, and the detection device 19 compares the detected positions A and B.

If the positions are different, the detection device 19 indicates an abnormal position of the lower sliding member 22b which is offset downstream with respect to the upper sliding member 22a.

The detection device 19 then detects a defect of a connecting rod by comparing the relative position of the two sliding members 22a, 22b.

In some variations, the double-acting cylinder is replaced by a single-acting closing cylinder 25a configured to maneuver the doors 12a, 12b towards the direct jet position. This single acting closing cylinder 25a is a closing actuator. The doors may be opened under the effect of pressure.

In a variant of this form, a single-acting opening actuator 25b is arranged on the fixed inner structure 11 on the side opposite the single-acting closing actuator, to maneuver the doors 12a, 12b towards the reverse jet position. This single-acting opening cylinder 25b is an opening actuator.

According to this variant, the single-acting opening actuator 25b is connected to each second connecting rods 18a, 18b. It is designed to actuate the opening of the doors 12a, 12b via these second connecting rods 18a, 18b.

The single-acting opening actuator 25b is connected to each sliding member 22a, 22b of the sliding element 17. It is designed to actuate the sliding of the sliding members 22a, 22b in the direction of the opening of the doors 12a, 12b.

Figure 7:
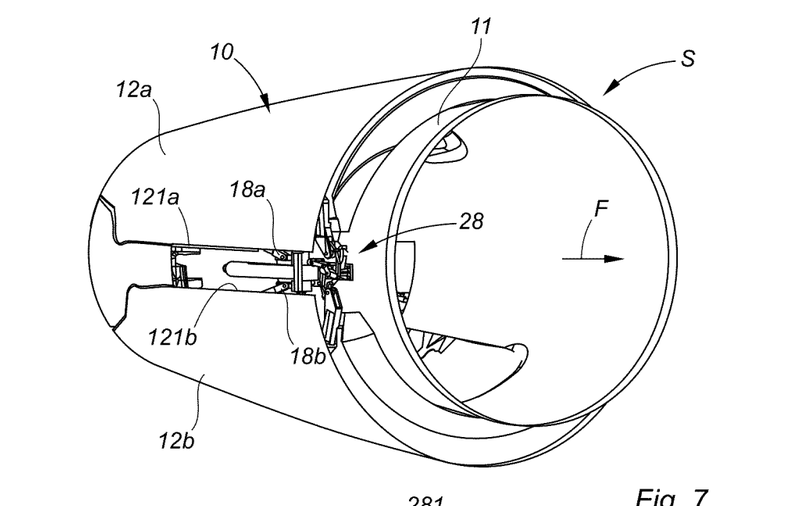
FIG. 7 is a different perspective view of the portion of the downstream section of the nacelle of FIG. 1, illustrating a closing system including an active locking system according to the present disclosure.
Figure 8:
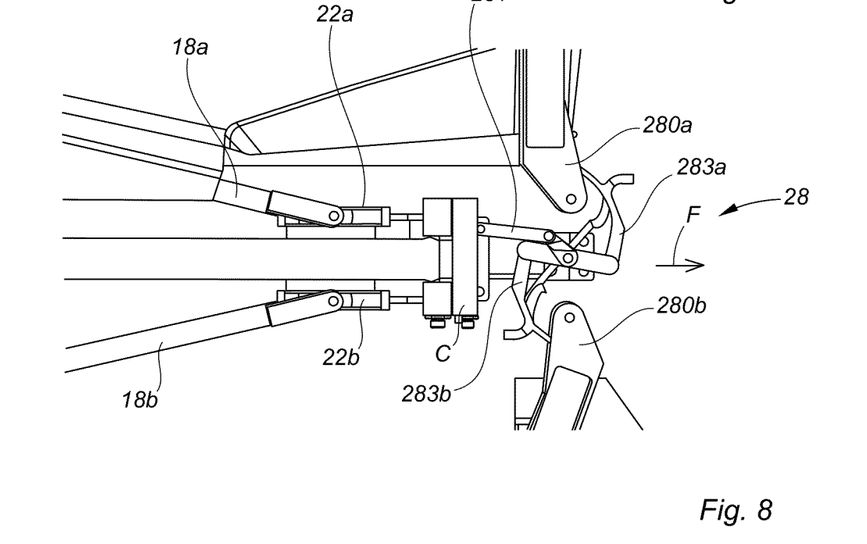
FIG. 8 is a side view of the active locking system of FIG. 7.

FIG. 7 shows the downstream section portion S of FIG. 1, seen from the other side. The upstream of the downstream section S is defined by the arrow F.

A door locking system 28 (also referred to herein as an active locking system 28) is arranged on the fixed inner structure 11, at the level of the second lateral edge 121a, 121b of the doors 12a, 12b.

The door locking system 28 is shown in the closed position.

With reference to FIGS. 8-14, the active locking system 28 in the blocked unlocking position of the doors in the open position including two locking means or devices (i.e., upper locking device 280a and lower locking device 280b, which are in the form of hooks in the example provided and also referred to herein as hooks 280a, 280b), an actuator or cylinder 281 of the locking device 280a, 280b, two blocking means or devices (i.e., upper blocking device 282a and lower blocking device 282b, which are in the form of obstacles in the example provided, also referred to herein as obstacles 282a, 282b), and two displacement devices (i.e., upper displacement device 22a and lower displacement device 22b, which are in the form of sliding members in the example provided).

The hooks 280a, 280b are arranged to let pass a roller (i.e., upper roller 29a and lower roller 29b) secured to a door 12a, 12b (FIGS. 1-3 and 7), so as to allow the opening and closing of the door 12a, 12b. The hooks 280a, 280b are in the unlocked position.

The hooks 280a, 280b are pivotally mounted to move between this unlocking position and a locking position (FIG. 14) in which they trap the rollers 29a, 29b in order to lock the doors in the closed position.

The actuator 281 of the hooks 280a, 280b is connected to the hooks 280a, 280b, by rods (i.e., upper rod 283a and lower rod 283b).

The actuator 281 of the hooks 280a, 280b is controlled by a locking control C configured to control both the locking of the hooks 280a, 280b, and the closing of the doors 12a, 12b (FIGS. 1-3 and 7).

Thus, when the closing of the doors 12a, 12b (FIGS. 1-3 and 7) is controlled, the locking of the hooks 280a, 280b is simultaneously controlled by displacement of the actuator 281 of the hooks 280a, 280b according to the arrow c.

The obstacles 282a, 282b are configured to block the rotation of the hooks 280a, 280b towards the locking position despite the locking control. They are in the blocked position. The obstacles 282a, 282b include a first arm A and a second arm B interconnected by a ball joint L. The first and second arms A, B are articulated between them.

The first arm A is fixed to the hook 280a, 280b, while the second arm B is fixed to the fixed inner structure 11 (FIG. 7).

A fixed stop (i.e., upper stop 285a and lower stop 285b) is disposed on the fixed inner structure 11 (FIG. 7), so as to limit the movement of the second arm B beyond a certain angle to provide the blocking function.

Figure 14:
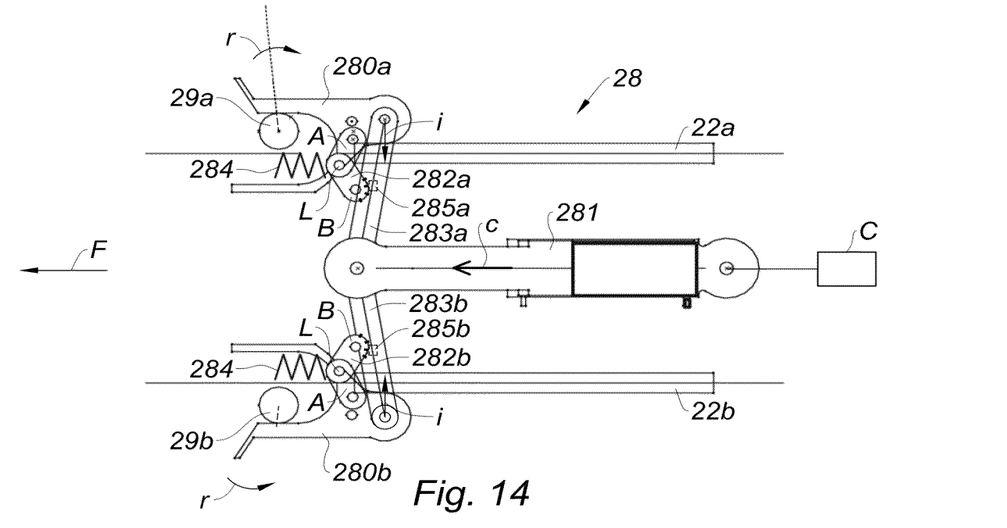
FIG. 14 is a side view of the active locking system of FIG. 7 illustrating the active locking system in the blocked locking position when the doors are in the closed position.
Figure 15:
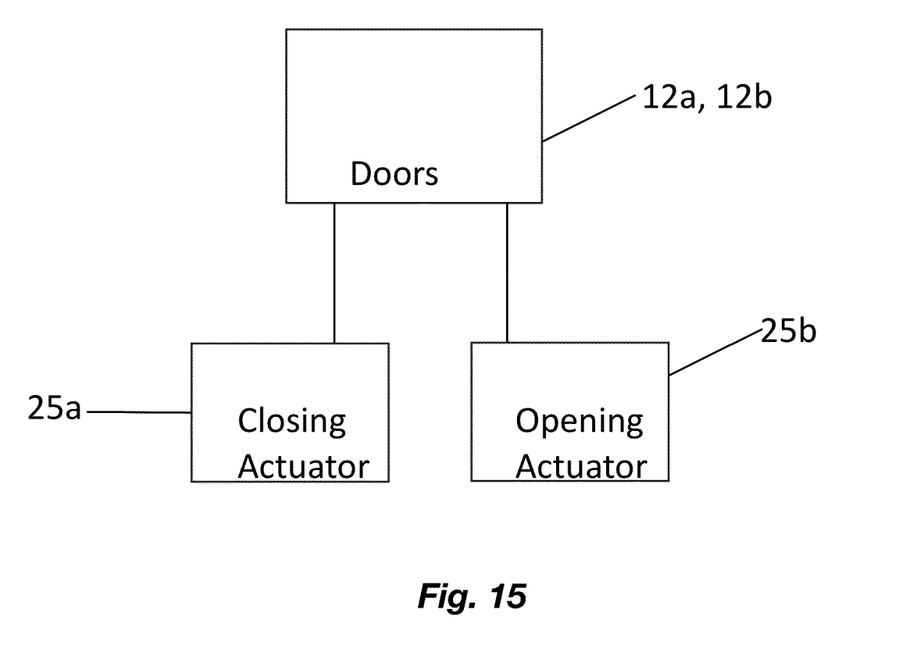
FIG. 15 is a block diagram illustrating components of an alternative locking system in accordance with the principles of the present disclosure.

The obstacles 282a, 282b are movably mounted between this blocking position and an unblocking position (FIG. 10) in which they allow the rotation of the hooks 280a, 280b towards the locking position (FIG. 14).

The displacement devices 22a, 22b of the obstacles 282a, 282b are able to slide so as to unblock the obstacles 282a, 282b when the doors are in the substantially closed position. The displacement devices 22a, 22b are arranged downstream of the obstacles 282a, 282b. The downstream is the opposite direction to upstream, the upstream being represented by the arrow F.

The displacement devices 22a, 22b are connected to the doors 12a, 12b (FIGS. 1-3 and 7), so as to slide in the direction of the obstacles 282a, 282b, that is to say in the upstream direction, when the doors 12a, 12b are closed until they reach the ball joints L or the second arm B of the obstacles 282a, 282b.

Thus, when the doors 12a, 12b (FIGS. 1-3 and 7) are in the substantially closed position (FIG. 7), the obstacles 282a, 282b are unblocked and the hooks 280a, 280b can pivot into the locking position.

A blocking spring 284 disposed upstream of the obstacles 282a, 282b, makes it possible to exert a force against the obstacles 2829a, 282b, at the level of their ball joint L, in the direction opposite to the displacement of the sliding member 22a, 22b when the door is closed, that is to say in the downstream direction.

Thus, the blocking spring 284 makes it possible to position the obstacle 282a, 282b in the blocking position.

In this blocking position, only one sliding of the sliding member 22a, 22b in the upstream direction is designed to displace the obstacle 282a, 282b into its unblocked position, by compressing the blocking spring 284.

Figure 10:
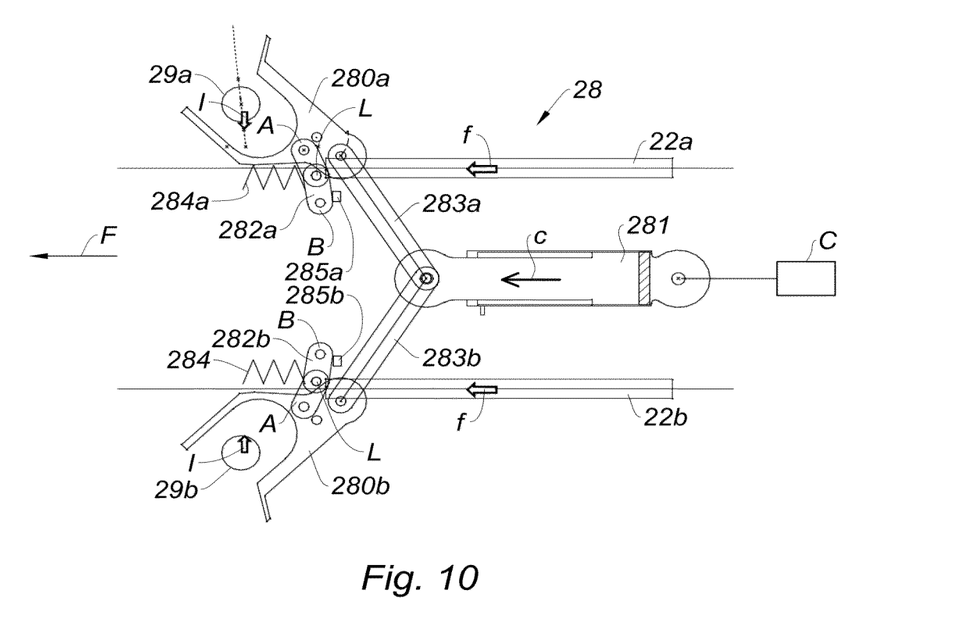
FIG. 10 is a side view of the active locking system of FIG. 7 illustrating the active locking system in an unblocked unlocking position when the doors are being closed.

FIG. 10 shows the active locking system 28 in the unblocked unlocking position of the doors during the closing.

When the doors are closed, the sliding members 22a, 22b slide according to the arrows "f", in the upstream direction.

When the sliding members 22a, 22b come into contact with the ball joint L of the obstacles 282a, 282b, the sliding members 22a, 22b displace the obstacles 282a, 282b, into their unblocking position.

When the sliding members 22a, 22b come into contact with this ball joint L, the rollers 29a, 29b secured to the doors are arranged inside the hooks 280a, 280b.

Figure 11:
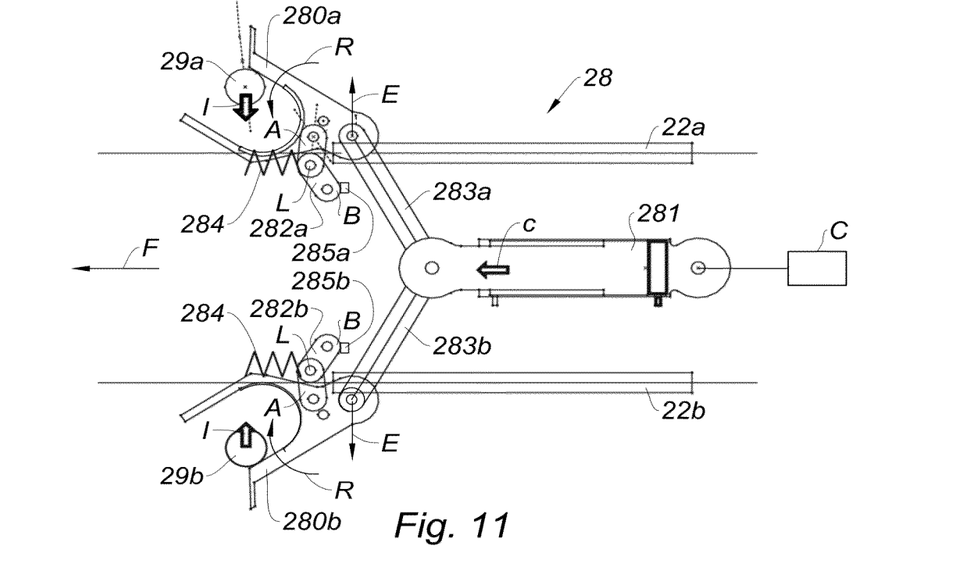
FIG. 11 is a side view of the active locking system of FIG. 7 illustrating the active locking system in an active locking position when the doors are being closed.

In this unblocking position, the actuator 281 of the locking device 280a, 280b is designed to rotate the hooks 280a, 280b, by means of the rods 283a, 283b (FIG. 11).

The blocking spring 284 is then compressed by the obstacles 282a, 282b displaced by the sliding members 22a, 22b. FIG. 11 shows the active locking system 28 in the active locking position of the doors 12a, 12b FIGS. 1-3 and 7) during the closing. The actuator 281 of the locking means 280a, 280b displaces the end of the rods 283a, 283b which are attached to it, upstream. Thus, the end of the rods 283a, 283b attached to the hooks 280a, 280b is displaced outwards, according to the arrows E. This displacement of the rods 283a, 283b causes a rotation of the hooks 280a, 280b in a first direction indicated by the arrows R. The hooks 280a, 280b then come into contact with the rollers 29a, 29b secured to the doors and displace them inwards, according to the arrows I, which causes the doors 12a, 12b (FIGS. 1-3 and 7) to be in the closed position. The active locking system 28 is therefore in the active locking position and allows assisting in closing the doors 12a, 12b.

The obstacles 282a, 282b, are also displaced following the movement of the hooks 280a, 280b and compress the blocking springs 284.

Figure 12:
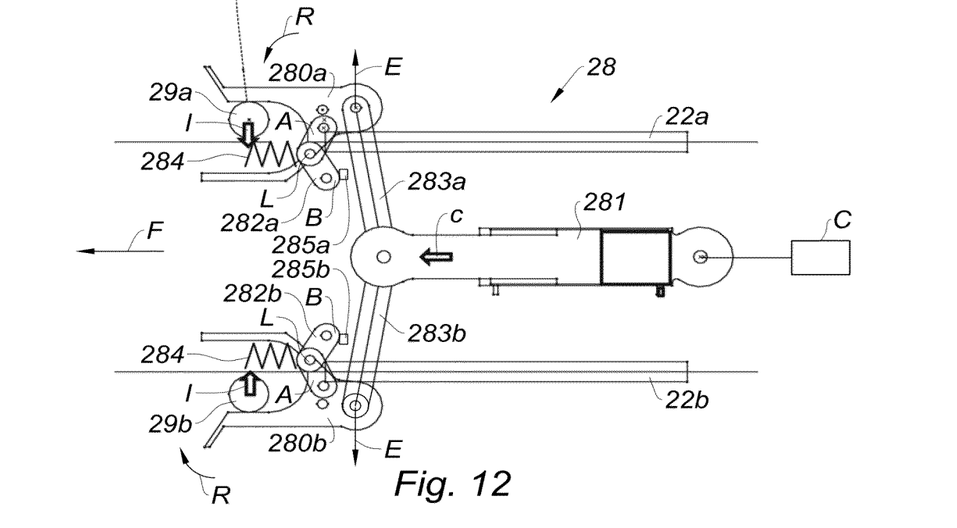
FIG. 12 is a side view of the active locking system of FIG. 7 illustrating the active locking system in the unblocked locking position when the doors are in the closed position.

FIG. 12 shows the active locking system 28 in the unblocked locking position of the doors 12a, 12b (FIGS. 1-3 and 7) in the closed position. The actuator 281 of the locking means 280a, 280b further displaces the end of the rods 283a, 283b attached to the hooks 280a, 280b, outwards, according to the arrows E.

This displacement of the rods 283a, 283b causes a rotation of the hooks 280a, 280b in a first direction indicated by the arrows R, which makes it possible to displace the rollers 29a, 29b inwards according to the arrows I. The doors 12a, 12b (FIGS. 1-3 and 7) are then in the closed position.

Figure 9:
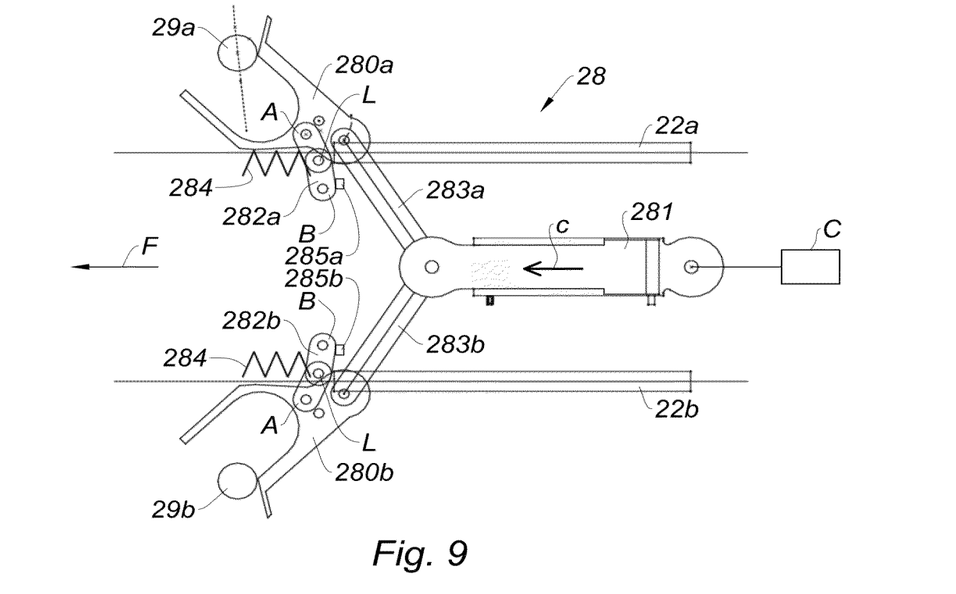
FIG. 9 is a side view of the active locking system of FIG. 7 illustrating the active locking system in a blocked unlocking position when the doors are in an open position.

In this position, the rods 283a, 283b allow the rotation of the hooks 280a, 280b towards the unlocking position (FIGS. 9 and 10). The active locking system 28 is therefore in the unblocked locking position.

Figure 13:
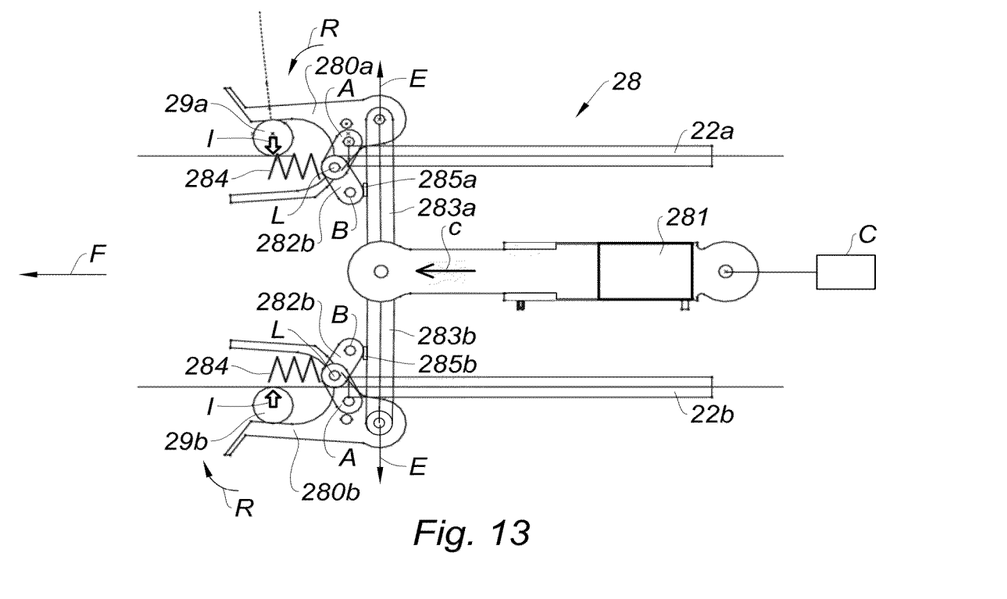
FIG. 13 is a side view of the active locking system of FIG. 7 illustrating the active locking system in the unblocked locking position when the doors are in an over-retracted position.

FIG. 13 shows the active locking system 28 in the unlocked locking position of the doors 12a, 12b (FIGS. 1-3 and 7) in the over-retracted position.

The actuator 281 of the locking means 280a, 280b further displaces the end of the rods 283a, 283b attached to the hooks, outwards, according to the arrows E.

This displacement of the rods 283a, 283b causes a rotation of the hooks 280a, 280b in the first direction indicated by the arrows R, which makes it possible to displace the rollers 29a, 29b inwards according to the arrows I. The doors 12a, 12b (FIGS. 1-3 and 7) are then in over-retracted position.

The term "over-retracted position" means that the doors (FIGS. 1-3 and 7) are closed beyond their normal rest position. In this position, the connecting rods 283a, 283b allow the rotation of the hooks 280a, 280b towards the unlocking position (FIGS. 9 and 10). The active locking system 28 is therefore in the unblocked locking position.

FIG. 14 shows the active locking system 28 in the unblocked locking position of the doors 12a, 12b (FIGS. 1-3 and 7) in the closed position. The actuator 281 of the locking means 280a, 280b displaces the end of the rods 283a, 283b which are attached to it upstream.

Thus, the end of the rods 283a, 283b attached to the hooks 280a, 280b is displaced inward, according to the arrows "i". This displacement of the rods 283a, 283b causes a rotation of the hooks 280a, 280b in the direction opposite to the first direction, indicated by the arrows "r". The doors 12a, 12b (FIGS. 1-3 and 7) are then in the closed position.

The obstacles 282a, 282b are also displaced by following the movement of the hooks 280a, 280b. In this position, the rods 283a, 283b do not allow the rotation of the hooks 280a, 280b towards the unlocking position (FIGS. 9 and 10). The rods 283a, 283b are in the blocking position of the hooks 280a, 280b. The active locking system 28 is therefore in the blocked locking position. The locking system 28 is actuated when the detection device 19 does not detect a defect in the connecting rod 16a, 16b, 18a, 18b.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A closing system for a pair of doors for a thrust reverser of an aircraft nacelle, the doors being diametrically opposed and pivotally mounted between a direct jet position in which the doors provide aerodynamic continuity of the aircraft nacelle, and a reverse jet position in which the doors open at least one passage in the aircraft nacelle, the closing system comprising:
- a closing actuator for the doors including two first connecting rods, each first connecting rod being configured to be connected to a first lateral edge of each door, the closing actuator being configured to move each door at least towards the direct jet position;
- two sliding members each carrying a second connecting rod configured to be connected to a second lateral edge of each door, the second lateral edge being opposite to the first lateral edge, the second connecting rods being configured to be driven by the doors when the closing actuator moves the doors towards the direct jet position so as to displace the two sliding members; and
- a detection device for detecting a defect of one of the first and second connecting rods, the detection device being configured to detect a relative position of the two sliding members in the direct jet position.

2. The closing system according to claim 1, wherein the closing actuator is configured to move the doors towards the direct jet position and towards the reverse jet position.

3. The closing system according to claim 1, wherein:
- the closing actuator is configured to move the doors towards the direct jet position; and
- an opening actuator is configured to move the doors towards the reverse jet position via the second connecting rods.

4. The closing system according to claim 1, further comprising a spring disposed at proximal ends of each sliding member relative to the detection device, and an end stop arranged between the detection device and each spring, the end stops are connected by a connecting device, each spring allowing a force to be exerted against a respective one of the sliding members in a direction opposite to a displacement generated by the second connecting rods driven by the doors in the direct jet position.

5. The closing system according to claim 4, wherein the end stops and the connecting device are sliding.

6. The closing system according to claim 5, wherein the end stops and the connecting device form a sliding element including two housings, each housing including one of the two sliding members, one of the springs and one of the end stops.

7. The closing system according to claim 6, wherein the sliding element is configured to slide under an action of at least one of the second connecting rods when the springs are is-compressed in a closing direction.

8. The closing system according to claim 1, further comprising a locking system configured to lock the doors in the direct jet position.

9. The closing system according to claim 8, wherein the locking system is configured to be disposed on a side opposite to the closing actuator.

10. The closing system according to claim 8, wherein the locking system is configured to be actuated when the detection device does not detect a defective connecting rod.

11. The closing system according to claim 8, wherein the locking system for the doors includes at least one active locking device configured to close the doors by applying a force thereto, the active locking device being movable between a locking position and an unlocking position.

12. A thrust reverser of an aircraft nacelle, the thrust reverser comprising:
- at least one pair of doors being diametrically opposed to each other, the doors being pivotally mounted such that the doors are pivotable between a direct jet position in which the doors provide aerodynamic continuity of the aircraft nacelle, and a reverse jet position in which the doors open at least one passage in the aircraft nacelle; and
- a closing system for the doors according to claim 1.

13. A method for using a closing system for a pair of doors for a thrust reverser of an aircraft nacelle, the doors being diametrically opposed and pivotally mounted such that the doors are pivotable between a direct jet position in which the doors provide aerodynamic continuity of the aircraft nacelle, and a reverse jet position in which the doors open at least one passage in the aircraft nacelle, the closing system comprising: a closing actuator for the doors including two first connecting rods, each first connecting rod being configured to be connected to a first lateral edge of each door, the closing actuator being configured to move each door at least towards the direct jet position; two sliding members each carrying a second connecting rod configured to be connected to a second lateral edge of each door, the second lateral edge being opposite the first lateral edge, the second connecting rods being configured to be driven by the doors when the closing actuator moves the doors towards the direct jet position so as to displace the two sliding members; and a detection device for detecting a defect of one of the first and second connecting rods, the detection device being configured to detect a relative position of the two sliding members in the direct jet position, the method comprising:
- comparing relative positions of the sliding members.

14. A method for using a closing system for a pair of doors for a thrust reverser of an aircraft nacelle, the doors being diametrically opposed and pivotally mounted such that the doors are pivotable between a direct jet position in which the doors provide aerodynamic continuity of the aircraft nacelle, and a reverse jet position in which the doors open at least one passage in the aircraft nacelle, the closing system comprising: a closing actuator for the doors including two first connecting rods, each first connecting rod being configured to be connected to a first lateral edge of each door, the closing actuator being configured to move each door at least towards the direct jet position; two sliding members each carrying a second connecting rod configured to be connected to a second lateral edge of each door, the second lateral edge being opposite the first lateral edge, the second connecting rods being configured to be driven by the doors when the closing actuator moves the doors towards the direct jet position so as to displace the two sliding members; a detection device for detecting a defect of one of the first and second connecting rods, the detection device being configured to detect a relative position of the two sliding members in the direct jet position; and a locking system configured to lock the doors in the direct jet position, the method comprising:
- comparing relative positions of the sliding members; and
- locking the doors in the direct jet position when the detection device does not detect any offset between the sliding members.

* * * * *